(12) United States Patent
Kim et al.

(10) Patent No.: US 7,027,047 B2
(45) Date of Patent: Apr. 11, 2006

(54) 3D GRAPHICS RENDERING ENGINE FOR PROCESSING AN INVISIBLE FRAGMENT AND A METHOD THEREFOR

(75) Inventors: Lee-Sup Kim, Daejeon Metropolitan (KR); Chang-Hyo Yu, Daejeon Metropolitan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 266 days.

(21) Appl. No.: 10/730,226

(22) Filed: Dec. 8, 2003

(65) Prior Publication Data

US 2005/0068319 A1   Mar. 31, 2005

(30) Foreign Application Priority Data

Sep. 29, 2003   (KR) ............... 10-2003-0067432

(51) Int. Cl.
*G06T 17/00* (2006.01)
(52) U.S. Cl. ........................ 345/419; 345/420
(58) Field of Classification Search ........... 345/418, 345/419, 420, 421, 422
See application file for complete search history.

(56) References Cited

U.S. PATENT DOCUMENTS

| | | | |
|---|---|---|---|
| 4,953,107 A * | 8/1990 | Hedley et al. | 345/422 |
| 6,456,285 B1 | 9/2002 | Hayhurst | |
| 6,603,474 B1 * | 8/2003 | Cobb et al. | 345/421 |
| 2002/0196251 A1 | 12/2002 | Duluk, Jr. et al. | |
| 2003/0002729 A1 * | 1/2003 | Wittenbrink | 382/154 |
| 2004/0130552 A1 * | 7/2004 | Duluk et al. | 345/506 |
| 2004/0169651 A1 * | 9/2004 | Everitt et al. | 345/426 |
| 2004/0196284 A1 * | 10/2004 | Huang et al. | 345/422 |
| 2005/0017974 A1 * | 1/2005 | Hong et al. | 345/426 |

* cited by examiner

*Primary Examiner*—Matthew C. Bella
*Assistant Examiner*—Cliff Vo
(74) *Attorney, Agent, or Firm*—F. Chau & Associates, LLC

(57) ABSTRACT

Provided are a 3D graphics rendering engine for processing fragments and a 3D graphics rendering engine method. The 3D graphics rendering engine positions a depth filter having a specific z value in a depth filtering circuit and compares a depth value of each of a plurality of fragments forming a first object being rasterized in a 3D space with a depth value of the depth filter. Then, the 3D graphics rendering engine stores data, which is mapped to the depth filter and corresponds to each of the fragments of the first object, in a storage device, based on the result of the comparison concerning the first object and rasterizes each of a plurality of fragments forming a second object. After that, the 3D graphics rendering engine renders the fragments of the first object and compares a depth value of each of the fragments of the second object in the 3D space with the depth value of the depth filter and removes at least one fragment from the second object that is overlapped with the first object, based on the result of the comparison concerning the second object and based on the data corresponding to each of the fragments of the first object, the data being stored in the storage device. In addition, the 3D graphics rendering engine corrects the position of the depth filter in real time according to the spatial distribution of rendered fragments.

16 Claims, 4 Drawing Sheets

3D GRAPHICS RENDERING ENGINE FOR PROCESSING AN INVISIBLE FRAGMENT AND A METHOD THEREFOR

BACKGROUND OF THE INVENTION

1. Technical Field

The present invention relates to a method for rendering graphics and a graphics rendering engine, and more particularly, to a method and apparatus for reducing a memory bandwidth by rapidly removing an invisible fragment via a depth filter in a three-dimensional (3D) space in a 3D graphics rendering engine.

2. Discussion of the Related Art

Generally, high-performance 3D rendering processors support interpolation, texture mapping, per-fragment operations, depth tests (also called Z-tests), etc.

In particular, texture mapping plays a key role in estimating the performance of 3D rendering processors. To support such texture mapping, large-scale hardware and high-capacity memory devices are required. In this sense, memory bandwidth is a factor in designing 3D rendering processors. In addition, the texture mapping's performance efficiency is a factor in designing 3D rendering processors.

To solve memory bandwidth-related problems in 3D graphics rendering engines, 3D graphics hardware manufacturers such as, ATI Technologies Inc. and NVIDIA® Corporation have suggested employing the Hyper-Z architecture and Light-speed Memory Architecture (LMA), respectively.

Since the Hyper-Z architecture and LMA require a 24-bit or 32-bit storage space for each fragment, an on-chip memory having a high-capacity storage space is necessary to implement the Hyper-Z architecture or LMA.

SUMMARY OF THE INVENTION

The present invention provides a method and apparatus for reducing the memory bandwidth in a 3D graphics rendering engine.

The present invention also provides a method of searching in real time for the optimal position of a depth filter according to a distribution of fragments being rendered.

According to one aspect of the present invention, there is provided a method of processing fragments of a 3D image. The method comprises: positioning a depth filter on a z-axis in a 3D space; first comparing a depth value of each of a plurality of fragments forming a first object being rasterized in the 3D space with a depth value of the depth filter; storing first object data corresponding to each of the fragments of the first object and the first comparison data in a storage device; rendering the fragments of the first object and second comparing a depth value of each of a plurality of fragments forming a second object being rasterized in the 3D space with the depth value of the depth filter; removing a fragment from the fragments of the second object that overlap a fragment of the first object using the first object data stored in the storage device and the second comparison data; and rendering the fragments of the first object and the fragments of the second object.

The storage device has a $\log_2(n+1)$-bit storage space for each fragment, where n is a natural number.

In the depth filter positioning step, the depth filter is also positioned in a predetermined position on the z-axis.

According to another aspect of the present invention, there is provided a method of sequentially rendering a first object and a second object in a 3D graphics rendering engine. The method comprises: positioning a depth filter on a z-axis in a 3D space; first comparing a depth value of each of a plurality of fragments of the first object being rasterized in the 3D space with a depth value of the depth filter; storing data, which is mapped to the depth filter, and corresponds to each of the fragments of the first object and the first comparison data, in a storage device; rasterizing each of the fragments of the second object; second comparing a depth value of each of the fragments of the second object with the depth value of the depth filter; removing a fragment from the second object, using the second comparison data and the first comparison data that is stored in the storage device; and outputting a fragment data that is formed of the first object data the second object data.

In the depth filter positioning step, when n depth filters are positioned on the z-axis, the storage device is implemented as static random access memory (SRAM).

In addition, the storage device may have a $\log_2(n+1)$-bit storage space for each fragment, where n is a natural number.

Also, in the depth filter positioning step, when n depth filters are positioned on the z-axis, the storage device includes a cache memory and an external memory device, in which the cache memory is implemented as a SRAM and the external memory device is implemented as a synchronous dynamic random access memory (SDRAM).

The cache memory and/or the external memory device additionally include a $\log_2(n+1)$-bit storage space for each fragment In the depth filter positioning step, the n depth filters may also be positioned in a predetermined number or positions on the z-axis.

The method further comprises: receiving the fragment data; performing a texturing; outputting the result of the texturing; receiving the result of the texturing; performing a per-fragmenting; outputting the result of the per-fragmenting; receiving the result of the per-fragmenting and a depth value of an image being displayed; third comparing the depth value of each of the fragments of the first object with the depth value of each of the fragments of the second object, based on the result of the per-fragmenting and the depth value of the image; and removing a fragment from the fragments of the second object, based on the third comparison data.

The method further comprises: fourth comparing the fragments of the second object that cannot be removed in the fragment removal step with the fragments of the second object that can be removed but have not been removed; and controlling a position of the depth filter based on the sixth comparison data.

According to yet another aspect of the present invention, there is provided a 3D graphics rendering engine comprising: an internal memory device; a pixel interpolating circuit; a texel interpolating circuit; and a depth filtering circuit. The internal memory device stores data. The pixel interpolating circuit receives 3D information and creates data for the pixels within a triangle, based on the received 3D information. The texel interpolating circuit creates data for the coordinates within the triangle in response to an output signal of the pixel interpolating circuit. The depth filtering circuit includes n depth filters positioned on a z-axis in a 3D space, wherein the depth filtering circuit: first compares a depth value of each of a plurality of fragments forming a first object being rasterized in a 3D space with a depth value of each of the n depth filters; stores first object data, which is mapped to the depth filter and corresponds to each of the fragments of the first object and the first comparison data in a storage device; rasterizes each of a plurality of fragments forming a second object; second compares a depth value of each of the fragments of the second object with the depth value of each of the n depth filters; removes a fragment from the fragments of the second object that overlap a fragment of the first object using the first object data in the storage device and the second comparison data; and outputs a fragment data formed of the first object data and of the second object data.

The depth filtering circuit may also include the n depth filters positioned in different positions on the z-axis.

The 3D graphics rendering engine further comprises a texture block, a per-fragment block, and a depth test block. The texture block receives the fragment data, performs a texturing, and outputs the result of the texturing. The per-fragment block receives the result of the texturing, performs a per-fragmenting, and outputs the result of the per-fragmenting. The depth test block receives the result of the per-fragmenting and a depth value of an image being displayed, wherein the depth test block: third compares the depth value of each of the fragments of the first object with the depth value of each of the fragments of the second object, based on the received result of the per-fragmenting and the received depth value of the image; removes a fragment from the fragments of the second object, based on the third comparison data; and fourth compares the fragments of the second object that cannot be removed through the fragment removal step with the number of fragments of the second object that can be removed but have not been removed; and outputs a position control signal for controlling a position of the depth filter based on the fourth comparison data.

BRIEF DESCRIPTION OF THE DRAWINGS

The above aspects of the present invention will become more apparent by describing in detail exemplary embodiments thereof with reference to the attached drawings, in which.

DETAILED DESCRIPTION OF THE EXEMPLARY EMBODIMENTS

Figure 1:
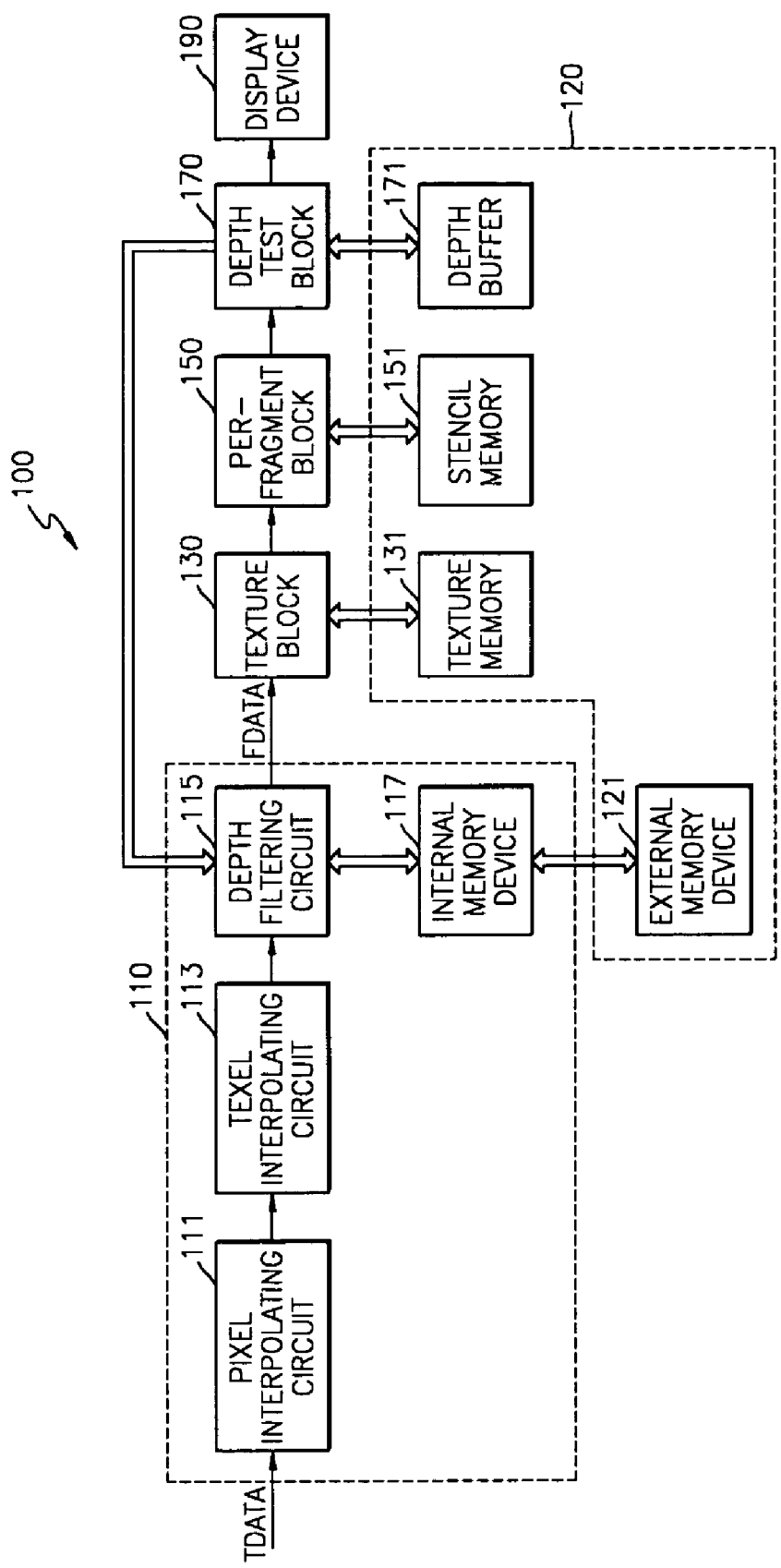
FIG. 1 is a block diagram of a 3D graphics rendering engine according to an exemplary embodiment of the present invention.

FIG. 1 is a block diagram of a 3D graphics rendering engine according to an exemplary embodiment of the present invention. A 3D graphics rendering engine 100 includes a rasterizer 110, a memory block 120, a texture block 130, a per-fragment block 150, a depth test block 170, and a display device 190. The memory block 120 includes an external memory device 121, a texture memory 131, a stencil memory 151, and a depth buffer 171. The external memory device 121, the texture memory 131, the stencil memory 151, and the depth buffer 171 may be implemented as SDRAM or double data rate (DDR)-SDRAM.

Every 3D image is created through a graphic pipeline. The first stage of the graphic pipeline is a geometric stage in which vector graphic information and background images hidden in the 3D image are converted into triangle data that can be processed by a computer. The second stage of the graphic pipeline is a rendering and shading stage in which the triangle data is converted into pixels that can be displayed on a monitor.

Thus, the rasterizer 110 processes the triangle data TDATA and creates fragment data FDATA. The rasterizer 110 includes a pixel interpolating circuit 111, a texel (texture element) interpolating circuit 113, a depth filtering circuit 115, and an internal memory device 117.

The pixel interpolating circuit 111 receives the triangle data TDATA and creates pixel data within a triangle defined by the triangle data TDATA using pixel interpolation. Here, the triangle data TDATA indicates information about the coordinates of vertices of the triangle. The triangle data TDATA includes information about vertex positions (x, y, z, w), information about texture coordinates (s, t, r, w), foggy data, and color information. Here, w is a value indicating 3D homogeneous coordinates and s, t, r, and w represent texture coordinates such as the information about vertex positions (x, y, z, w).

The texel interpolating circuit 113 receives an output signal of the pixel interpolating circuit 111 and creates coordinate data within the triangle that is defined by the triangle data TDATA using texel interpolation. Here, the created data indicates the coordinates of texture data necessary for texturing.

Figure 2:
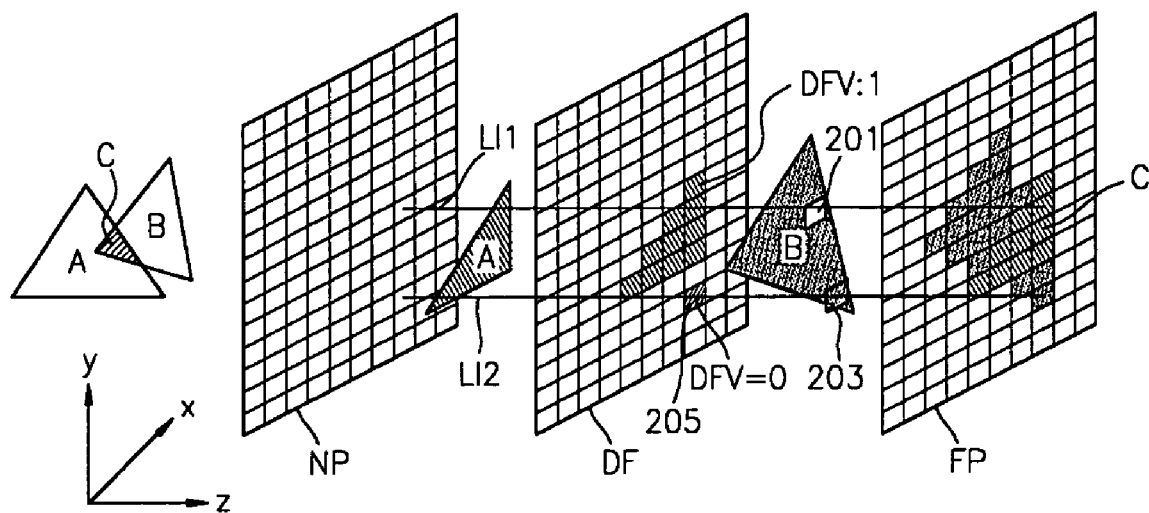
FIG. 2 is a conceptual view of a depth filter in a 3D space according to an embodiment of the present invention.

FIG. 2 is a conceptual view of a depth filter in the 3D space according to an embodiment of the present invention. Below are descriptions of the architecture and operation of the depth filtering circuit 115 with reference to FIGS. 1 and 2.

Here, a Near Plane (NP) represents a plane closest to a person's eyes in the 3D space and a Far Plane (FP) represents a plane farthest from the person's eyes in the 3D space. DF represents a depth filter positioned in a predetermined position on the z-axis in the 3D space defined by the NP and the FP. Thus, visible fragments exist between the NP and the FP.

First, it is assumed that a first object A and a second object B, displayed on a screen of the display device 190, include a plurality of fragments, respectively, and the second object B is rendered (i.e., rasterized) after the first object A is rendered.

The depth filtering circuit 115 includes the depth filter DF positioned on the z-axis in the 3D space. The depth filter DF is in a position having a predetermined z value. A number (n), which may be a number equal to one or more, of depth filters can be positioned between the NP and the FP.

The depth filtering circuit 115 compares a depth value of each of the fragments of the first object A being rasterized in the 3D space with a depth value of the depth filter DF and stores data corresponding to each of the fragments of the first object A in the internal memory device 117, based on the result of the comparison.

For example, when the depth value of each of the fragments of the first object A being rasterized in the 3D space is smaller than the depth value of the depth filter DF, a depth filtering value DFV of an area that is formed by mapping each of the fragments of the first object A to the depth filter DF is set to "1" and is then stored in the internal memory device 117. The depth filtering values DFV of other areas are set to "0" and are then stored in the internal memory device 117.

Consequently, when a single depth filter is included in the depth filtering circuit 115, the internal memory device 117 only requires a 1-bit storage space for storing data for each fragment. However, when n depth filters are included in the depth filtering circuit 115, the internal memory device 117 requires a $\log_2(n+1)$-bit storage space for storing data for each fragment.

The internal memory device 117 may be implemented as a SRAM. Thus, the memory bandwidth of the internal memory device 117 is significantly reduced when compared to the memory bandwidths of 24 or 32 bits for each fragment, used in Hyper-Z and LMA.

After the first object A is rasterized, the depth filtering circuit 115 compares a depth value of each of the fragments of the second object B being rasterized in the 3D space with the depth value of the depth filter DF and removes, in advance, at least one fragment C that is to be overlapped with at least one fragment of the first object A from the second object B, based on the result of the comparison and the data stored in the internal memory device 117.

For example, a fragment 201 in a line LI1 is removed as follows. When the plane coordinates of a fragment of the first object A are the same as those of the fragment 201 of the second object B and the depth value of the fragment 201 of the second object B is greater than the depth value of the depth filter DF, the depth filtering circuit 115 removes the fragment 201 from the second object B based on the data (e.g., "1") stored in the internal memory device 117 and the result of the comparison.

However, a fragment 203 in a line LI2 will not be removed in the following case. Although the depth value of the fragment 203 of the second object B is greater than the depth value of the depth filter DF, since data corresponding to a cell 205, which is stored in the internal memory device 117, is "0" (i.e., there is no fragment of the first object A which is to be overlapped with the fragment 203 of the second object B), the depth filtering circuit 115 cannot remove the fragment 203 from the second object B.

The depth filtering circuit 115 outputs data for each of the fragments of the first object A and data for each of the fragments of the second object B to the texture block 130 as fragment data FDATA, except for data for at least one fragment C of the second object B that is overlapped with at least one fragment of the first object A.

In other words, the depth filtering circuit 115 according to an embodiment of the present invention performs a depth test prior to the depth test of the depth test block 170 and rapidly removes at least one fragment C that is invisible due to overlap with at least one fragment of the first object A from the second object B.

Figure 3:
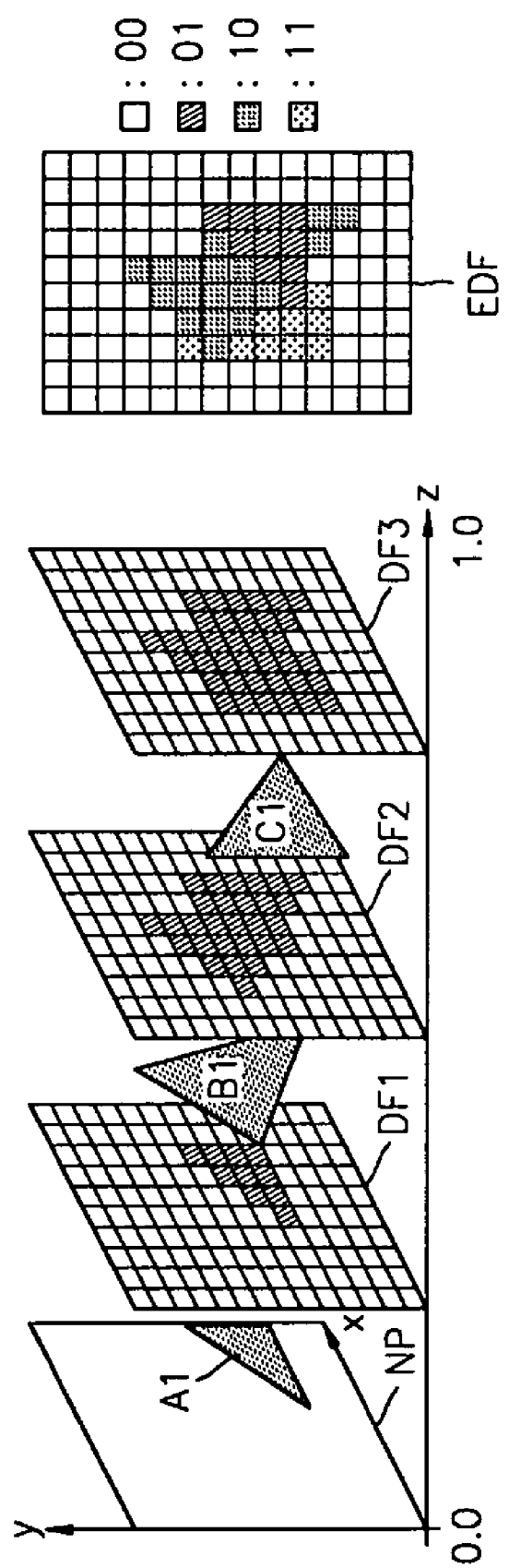
FIG. 3 shows the spatial arrangement of three depth filters according to an embodiment of the present invention.

FIG. 3 shows the spatial arrangement of three depth filters according to an embodiment of the present invention. FIG. 3 shows a case where three (n=3) depth filters are positioned on the z-axis to rapidly remove more fragments.

Here, DF1, DF2, and DF3 designate a first depth filter, a second depth filter, and a third depth filter, which are positioned perpendicular to the z-axis. The depth filtering circuit 115 compares a depth value of each of the three filters with a depth value of each of the fragments of objects A1, B1, and C1 being rasterized and stores data of 2 bits in the internal memory device 117, based on the result of the comparison.

EDF denotes a map formed by encoding data, which is sequentially stored in the internal memory device 117 according to a rasterization order of the objects A1, B1, and C1, through the three depth filters DF1, DF2, and DF3. Here, it is assumed that "00" indicates empty cell areas where there is no overlap, "01" indicates values of cell areas of the depth filter DF3 that are overlapped with the objects A1, B1, and C1, "10" indicates values of cell areas of the depth filter DF2 that are overlapped with the objects A1 and B1, and "11" indicates values of cell areas of the depth filter DF1 that are overlapped with the object A1.

When the number of depth filters is 3, the internal memory device 117 requires a $\log_2(n+1)$-bit=2 bit storage space for each fragment. As the storage space increases, the effect of removing fragments also increases. If the 3D graphics rendering engine 100 requires a high operating speed, it may not include the external memory device 121. This is accomplished by storing the data of the depth filters in the internal memory device 117.

On the other hand, the external memory device 121 may be used to minimize the size of the internal memory device 117. In this case, the internal memory device 117 may be implemented as a cache memory using SRAM and the external memory device 121 may be implemented as SDRAM or DDR-SDRAM.

The texture block 130, as shown in FIG. 1, receives the fragment data FDATA, performs texturing, and outputs the result of the texturing to the per-fragment block 150. The texture block 130 additionally performs texturing using color information for each pixel, stored in the texture memory 131.

The per-fragment block 150, as shown in FIG. 1, receives the result of the texturing of the texture block 130, performs per-fragmenting, and outputs the result of the per-fragmenting to the depth test block 170. The per-fragment block 150 additionally performs a fog operation, a stencil operation, or alpha blending. When the per-fragment block 150 performs the stencil operation, it uses information about rendering areas, stored in the stencil memory 151.

The depth test block 170, as shown in FIG. 1, receives the result of the per-fragmenting and a depth value of an image being displayed on the display device 190, compares the depth value of each of the fragments of the first object A with the depth value of each of the fragments of the second object B, based on the received result of the per-fragmenting and the received depth value of the image, and removes at least one fragment from the second object B, based on the result of the comparison.

In addition, the depth test block 170 outputs to the depth filtering circuit 115 a position control signal for controlling, in real time, the spatial position of a depth filter according to the spatial distribution of rendered fragments.

Figure 4:
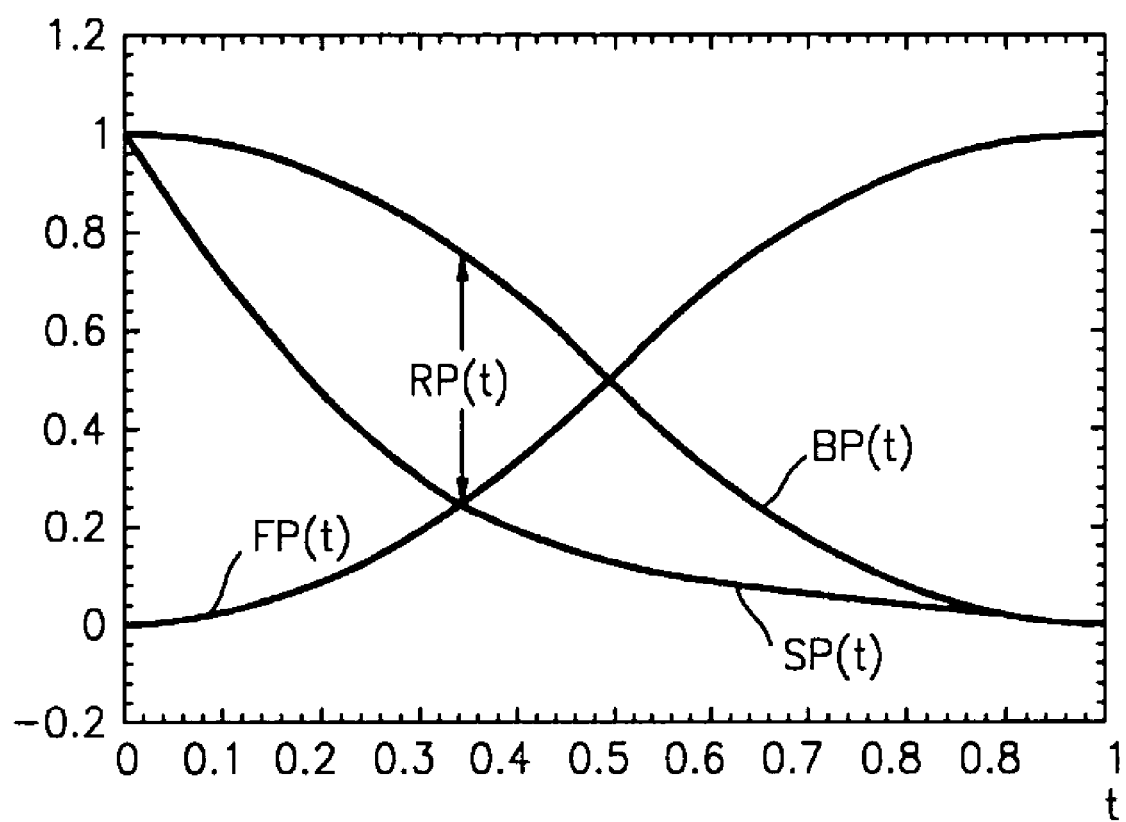
FIG. 4 is a graph showing the distribution of entire fragments with respect to the position of a depth filter, according to an embodiment of the present invention.

FIG. 4 is a graph showing the distribution of entire fragments with respect to the position of a depth filter, according to an embodiment of the present invention. Below is an example of controlling, in real time, the spatial position of a depth filter according to the spatial distribution of rendered fragments by means of the depth test block 170.

Here, t represents the position of a depth filter, a vertical axis represents the accumulated value of fragments, RP represents the number of fragments removed by the depth filtering circuit 115, FP represents the number of fragments that cannot be removed structurally, BP represents the total number of fragments that can be removed by the depth filtering circuit 115, and SP represents the number of fragments that can be removed by the depth filtering circuit 115, but have not been removed due to a rendering order of objects.

The depth test block 170 compares an accumulated value of the FP with an accumulated value of the SP and predicts the position of, for example, the depth filter DF of FIG. 2 with respect to the next image frame based on the result of the comparison. In other words, as shown in FIG. 4, the most fragments are removed in a position (t) where the FP and the SP intersect. Thus, when the FP and the SP intersect with each other, the depth test block 170 outputs to the depth filtering circuit 115 a position control signal for controlling the position of the depth filter DF shown in FIG. 2 on the z-axis in the 3D space. As a result, the depth filtering circuit 115 controls the position of the depth filter on the z-axis in response to the position control signal.

A 3D graphics rendering engine according to the present invention can search in real time for an optimal position where the FP and the SP partly intersect and correct the position of a depth filter, thereby rapidly removing at least one invisible fragment.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A method of processing fragments of a 3D image, the method comprising:
    positioning a depth filter on a z-axis in a 3D space;
    first comparing a depth value of each of a plurality of fragments forming a first object being rasterized in the 3D space with a depth value of the depth filter;
    storing first object data corresponding to each of the fragments of the first object in a storage device based on a result of the first comparison;
    rendering the fragments of the first object and second comparing a depth value of each of a plurality of fragments forming a second object being rasterized in the 3D space with the depth value of the depth filter;
    removing a fragment from the fragments of the second object that overlap a fragment of the first object based on the first object data stored in the storage device and a result of the second comparison; and
    rendering the fragments of the first object and the fragments of the second object.

2. The method of claim 1, wherein the storage device has a $\log_2(n+1)$-bit storage space for each fragment, where n is a natural number.

3. The method of claim 1, wherein in the depth filter positioning step, the depth filter is positioned in a predetermined position on the z-axis.

4. A method of sequentially rendering a first object and a second object in a 3D image, the method comprising:
    positioning a depth filter on a z-axis in a 3D space;
    first comparing a depth value of each of a plurality of fragments of the first object being rasterized in the 3D space with a depth value of the depth filter;
    storing first object data, which is mapped to the depth filter, and corresponds to each of the fragments of the first object in a storage device based on a result of the first comparison;
    rasterizing each of the fragments of the second object;
    second comparing a depth value of each of the fragments of the second object with the depth value of the depth filter;
    removing a fragment from the second object, based on the first comparison data that is stored in the storage device and a result of the second comparison data; and
    outputting a fragment data that is formed of the first object data and the second object data.

5. The method of claim 4, wherein in the depth filter positioning step, when n depth filters are positioned on the z-axis, the storage device is implemented as a SRAM.

6. The method of claim 5, wherein the storage device has a $\log_2(n+1)$-bit storage space for each fragment, where n is a natural number.

7. The method of claim 4, wherein in the depth filter positioning step, when n depth filters are positioned on the z-axis, the storage device includes a cache memory and an external memory device, in which the cache memory is implemented as a SRAM and the external memory device is implemented as a SDRAM.

8. The method of claim 7, wherein at least one of the cache memory and the external memory device has a $\log_2(n+1)$-bit storage space for each fragment.

9. The method of claim 4, wherein in the depth filter positioning step, n depth filters are positioned in a predetermined number of different positions on the z-axis.

10. The method of claim 4, further comprising:
    receiving the fragment data;
    performing a texturing;
    outputting the result of the texturing;
    receiving the result of the texturing;
    performing a per-fragmenting
    outputting the result of the per-fragmenting; and
    receiving the result of the per-fragmenting and a depth value of an image being displayed;
    third comparing the depth value of each of the fragments of the first object with the depth value of each of the fragments of the second object, based on the result of the per-fragmenting and the depth value of the image; and
    removing a fragment from the fragments of the second object, based on the third comparison data.

11. The method of claim 10, further comprising:
    fourth comparing the fragments of the second object that cannot be removed in the fragment removal step with the fragments of the second object that can be removed but have not been removed; and
    controlling a position of the depth filter based on a result of the fourth comparison.

12. A 3D graphics rendering engine comprising:
    an internal memory device, which stores data;
    a pixel interpolating circuit, which receives 3D information and creates data for the pixels within a triangle, based on the received 3D information;
    a texel interpolating circuit, which creates data for the coordinates within the triangle in response to an output signal of the pixel interpolating circuit; and
    a depth filtering circuit, which includes n depth filters positioned on a z-axis in a 3D space, wherein the depth filtering circuit:
    first compares a depth value of each of a plurality of fragments forming a first object being rasterized in a 3D space with a depth value of each of the n depth filters;
    stores first object data, which is mapped to the depth filter and corresponds to each of the fragments of the first object in a storage device based on a result of the first comparison;
    rasterizes each of a plurality of fragments forming a second object;
    second compares a depth value of each of the fragments of the second object with the depth value of each of the n depth filters;
    removes a fragment from the fragments of the second object that overlap a fragment of the first object based on the first object data stored in the storage device and a result of the second comparison data; and outputs a fragment data formed of the first object data and the second object data.

13. The 3D graphics rendering engine of claim 12, wherein the storage device has a $\log_2(n+1)$-bit storage space for each fragment, where n is a natural number.

14. The 3D graphics rendering engine of claim 12, wherein the n depth filters are positioned in different positions on the z-axis.

15. The 3D graphics rendering engine of claim 12, further comprising:
- a texture block, which receives the fragment data, performs a texturing, and outputs the result of the texturing;
- a per-fragment block, which receives the result of the texturing, performs a per-fragmenting, and outputs the result of the per-fragmenting; and
- a depth test block, which receives the result of the per-fragmenting and a depth value of an image being displayed, wherein the depth test block:

third compares the depth value of each of the fragments of the first object with the depth value of each of the fragments of the second object, based on the received result of the per-fragmenting and the received depth value of the image; and removes a fragment from the fragments of the second object, based on a result of the third comparison.

16. The 3D graphics rendering engine of claim 12, wherein the depth test block:

fourth compares the fragments of the second object that cannot be removed through the fragment removal step with the number of fragments of the second object that can be removed but have not been removed; and outputs a position control signal for controlling a position of the depth filter based on a result of the fourth comparison.

* * * * *